United States Patent [19]

Buchner

[11] 4,224,980
[45] Sep. 30, 1980

[54] THERMALLY STRESSED HEAT-CONDUCTING STRUCTURAL PART OR CORRESPONDING STRUCTURE PART CROSS SECTION

[75] Inventor: Helmut Buchner, Wendlingen, Fed. Rep. of Germany

[73] Assignee: Daimler-Benz Aktiengesellschaft, Fed. Rep. of Germany

[21] Appl. No.: 876,064

[22] Filed: Feb. 8, 1978

[30] Foreign Application Priority Data

Feb. 9, 1977 [DE] Fed. Rep. of Germany ....... 2705353

[51] Int. Cl.³ ........................................... G05D 23/00
[52] U.S. Cl. ...................................... 165/32; 165/51; 165/185
[58] Field of Search .................. 165/32, DIG. 17, 96, 165/51, 185

[56] References Cited
U.S. PATENT DOCUMENTS 3,167,159  1/1965  Bovenkerk ......................... 165/96 X Primary Examiner—Albert W. Davis
Assistant Examiner—Margaret A. Focarino
Attorney, Agent, or Firm—Craig & Antonelli

[57] ABSTRACT

A thermally stressed heat-conducting structural part with a temperature gradient that forms during operation, in which at least one layer of metal hydride is embedded in a hydrogen-impervious and heat-conducting manner transversely to the temperature gradient.

10 Claims, 7 Drawing Figures

THERMALLY STRESSED HEAT-CONDUCTING STRUCTURAL PART OR CORRESPONDING STRUCTURE PART CROSS SECTION

The present invention relates to a thermally stressed heat-conducting structural part or to a corresponding structural part cross section with a temperature gradient forming in the structural part or in the structural part cross section during the operation.

Thermal operations are to proceed for the most part at an optimum operating temperature of the involved machines or aggregate parts. Especially with thermal engines, losses in heat energy, harmful exhaust gas developments and also aggressively acting condensations of the exhaust gases occur during the warm-up phase. For these reasons and other reasons, it is therefore desirable that the thermally stressed structural parts of internal combustion engines reach, starting from a cold start, their operating temperatures as rapidly as possible and maintain this temperature. It may thereby be necessary or also permissive that certain portions of individual structural parts reach a higher permanent temperature than other portions of the same structural part or of the same machine. It is known by suitable material selection or by suitable compound construction of poorly heat-conducting materials or air gaps and good heat-conducting materials to bring about certain temperature profiles in an engine or in the structural parts thereof during the engine operation. A rapid heating-up of engine parts during the warm-up phase can be achieved with such measures; however at the same time also the temperature level at the respective place will be raised by the arrangement of poorly conducting coatings or intermediate layers, which is quite an undesirable phenomenon that had to be accepted.

It is the aim of the present invention to indicate measures which enable as rapid as possible a heating-up of machine or engine structural parts during a warm-up phase without at the same time also raising therewith the temperature level of the permanent temperature. The underlying problems are solved according to the present invention in that at least one layer of metal hydride is incorporated or embedded hydrogen-imperviously and heat-conductingly transversely to the temperature gradient in the structural part or structural part cross section.

The embedded layer of metal hydride which must be closed off hermetically and above all imperviously to hydrogen diffusion, and which is to contain a certain pore volume, represents a closed system which is changeable fully reversibly depending on the temperature condition between two different properties of the material, namely, on the one hand, metal and, on the other hand, metal hydride. If hydrogen is incorporated in the metals and the alloys thereof, then the binding takes place metallically, i.e., each hydrogen atom gives off its electron to the conductivity band in the crystal structure of the metal, whereby the electron density in the conductivity band increases to the complete saturation of this band. In the fully occupied conductivity band, the electron movability is zero or strongly reduced. As a result thereof the electrically conductive and thermally conductive metal becomes by reason of the hydrogen incorporation and the conversion into a hydride, a material which is not conductive or poorly conductive electrically and with respect to heat. As a result of desorption of the hydrogen out of the hydride, the original conductivity of the metal can be re-established. The incorporation or inclusion of the hydrogen in the crystal structure of the metal is an exothermic process and the release energy for the hydrogen is removed from the surroundings. In the cold condition, the hydrogen contained in the closed system is most far-reachingly bound to a metal hydride. Consequently, in the cold condition, the embedded material represents a heat insulator. Since the hydrogen is completely removed from the pores, nearly a vacuum exists within the same so that also a convective heat transfer in the pore spaces is nearly precluded. As a result of heat supply, the hydrogen is again released out of the crystal structure and reaches the pores in gaseous condition, in which a relatively high gas pressure will form depending on the temperature of the embedded layer. With high temperatures of the embedded layer, a metal that conducts well the heat therefore exists again and a gas under pressure is present in the pores as a result of which also a relatively good convective heat transmission is possible.

Accordingly, it is an object of the present invention to provide a thermally stressed heat-conducting structural part or corresponding structural part cross section which avoids by simple means the aforementioned drawbacks and shortcomings encountered in the prior art.

Another object of the present invention resides in a thermally stressed heat-conducting structural part or corresponding structural part cross section which permits the structural part or structural part cross section to reach its normal operating temperature as rapidly as possible without requiring higher permanent temperature levels.

A further object of the present invention resides in a thermally stressed heat-conducting structural part in which the temperature level does not have to be raised notwithstanding its ability to rapidly attain normal operating temperatures.

Another object of the present invention resides in a thermally stressed part of the type described above which at relatively low temperatures represents a good heat insulator and which becomes a good heat conductor at relatively higher temperature.

These and other objects, features and advantages of the present invention will become more apparent from the following description when taken in connection with the accompanying drawing which shows, for purposes of illustration only, several embodiments in accordance with the present invention, and wherein.

Figure 1:
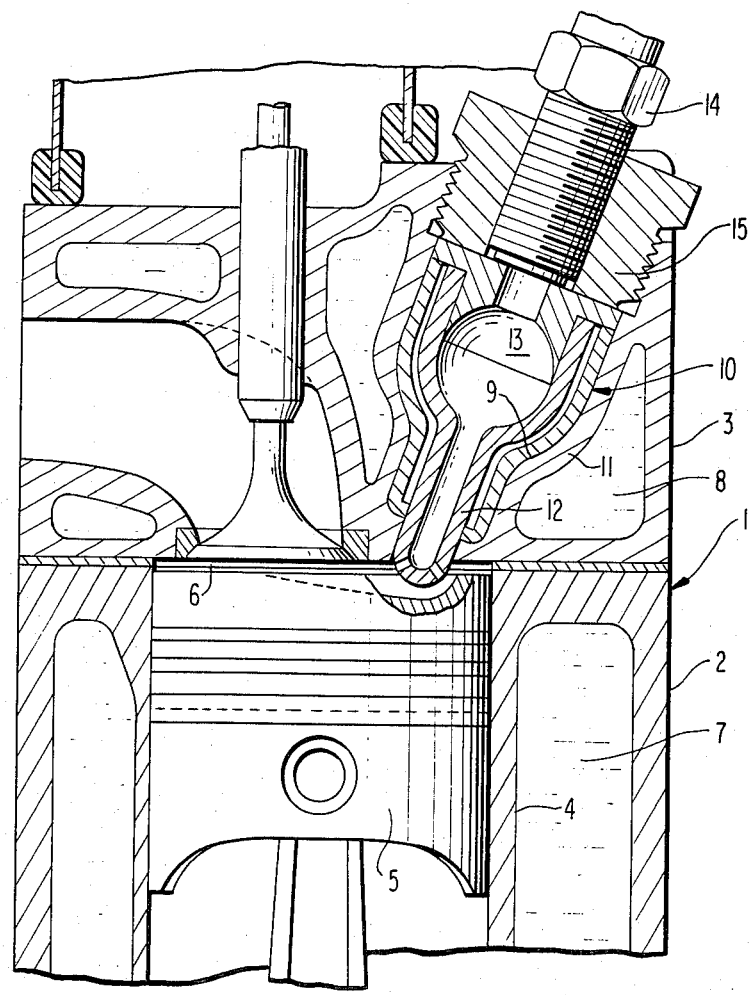
FIG. 1 is a cross-sectional view through a cylinder head portion of an auto-igniting reciprocating piston internal combustion engine provided with a prechamber insert in accordance with the present invention.

Referring now to the drawing wherein like reference numerals are used throughout the various views to designate like parts, and more particularly to FIG. 1, the prechamber diesel engine generally designated by reference numeral 1 includes an engine block 2 with a liner 4 and a cylinder head 3. The piston 5 reciprocating in the liner 4 delimits, in the downward direction, the working space 6. A water jacket 7 is arranged in the engine block 2 about the liner 4 for the heat removal and water spaces 8 are provided in the cylinder head 3. A receiving space 9 for a prechamber insert generally designated by reference numeral 10 is provided in the cylinder head which is created by correspondingly formed water-cooled walls 11 of the cylinder head 3. The prechamber 10 consists of a spherical space 13 with a neck 12 extending in the direction toward the main combustion space 6, which neck is in communication with the combustion space 6 by way of overflow bores. The prechamber insert 10 is retained in the cylinder head 3 by a fastening bolt 15, into which the injection valve 14 is also screwed in.

Figure 2:
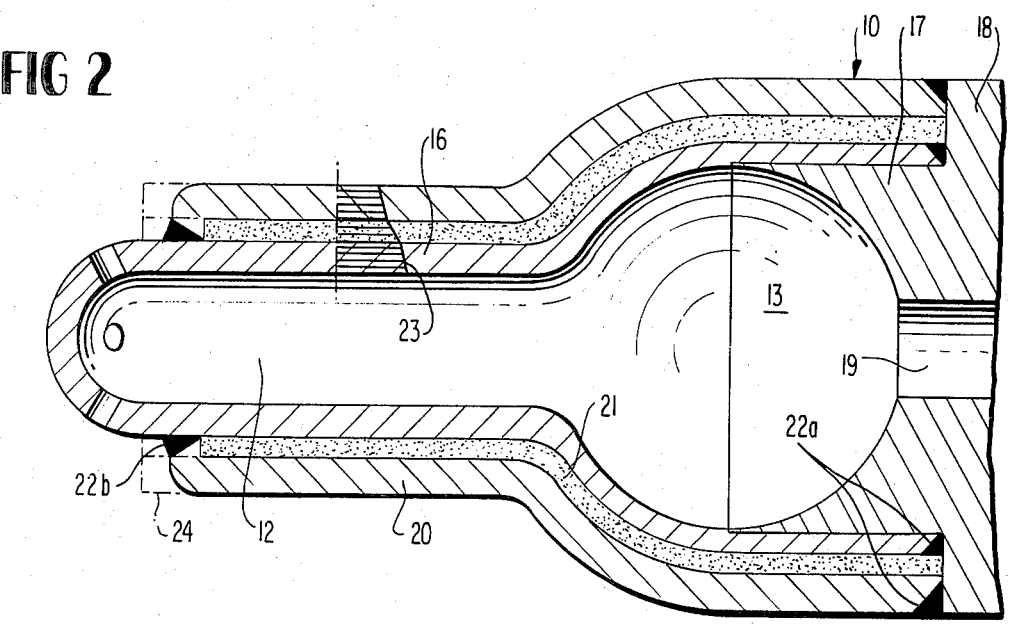
FIG. 2 is a cross-sectional view through the prechamber insert of the internal combustion engine according to FIG. 1.

The prechamber insert 10 which is illustrated in FIG. 2 on an enlarged scale is constructed of three shells. It includes initially an inner wall 16 which has a bottle-like configuration and is provided for the formation of the spherical space 13 with an insert for the formation of the spherical space back wall 17. The spherical space back wall 17 carries at its outer side a flange 18, to which the inner end face of the inner wall 16 is welded (welding seam 22a). An outer wall 20 is arranged concentrically about the inner wall 16 while leaving free an approximately equidistant hollow space. The outer wall 20 is also welded together with its inner end face gas-tight to the flange 18. The intermediate space or interstice between the two walls 16 and 20 is filled with a porous metal hydride. The outer wall 20 is welded together gas-tight with the inner wall 16 along the outer end face thereof (welding seam 22b). The wall materials 16 and 20 must be of hydrogen-diffusion-impervious material.

The manufacture of the prechamber insert 10 could be, for example, as follows: Two walls 16 and 20 are at first welded concentrically to the flange 18 of the spherical space back wall 17. The outer wall 20 is initially constructed to extend along its outer end face axially rectilinearly according to the dash line showing 24. As a result thereof, an annular gap is created between the two walls 16 and 20 through which a metal hydride powder can be filled and stamped into the intermediate space. A ring-shaped plunger can be introduced through the gap for compressing the filling. The entire assembly is then heated in a furnace under compressing action to sintering temperatures whereby the granules of the filling sinter together and produce a crank-free and gap-free composite (compound) structure which, however, still has a certain porous volume. Following the sintering operation, the axially overlapping outer edge 24 is flanged over into the position illustrated in full lines and the welding seam 22b is produced. The cooling-off after the sintering should take place in a hydrogen atmosphere so that a metal hydride will form in the sintered layer. For purposes of forming the welding seam 22b, a method should be selected which causes as little heat as possible to flow into the workpiece so that the metal hydride does not again decompose. At least shortly prior to the completion of the welding seam 22b, the pore volume should be evacuated. Appropriately, the welding seam 22b is carried out as electron beam welding under vacuum because both the pore volume of the sintered layer is evacuated thereby—the welding must be carried out in a vacuum—as also the heat input during the welding is extraordinarily low.

The operating of the embedded layer 21 in the prechamber insert is now as follows. In the cold condition the layer is hydrogenated and thus a very poor heat conductor. During the start of the diesel engine the inner wall 16 of the prechamber insert 10 is very rapidly heated up by the compression heat of the compressed air by reason of its low mass also without any starting assist such as, for example, preliminary heating; an escape of the applied heat is prevented by the non-conducting layer. The starting behavior of a prechamber diesel engine with a prechamber insert constructed in such a manner will be similarly good also without starting assist as that of a directly injecting diesel engine. If the prechamber insert 10 is then once well-heated through after a short driving distance, then by reason of the thermal decomposition of the hydride, the heat-insulating effect of the layer 21 is lost; this means, the prechamber insert 10 is cooled by the cylinder head or the wall 11 in the usual manner and is kept at operating temperature.

Further possibilities of the application of the inventive concept are illustrated by reference to the embodiment of the stratified charge engine generally designated by reference numeral 30 and illustrated in FIG. 3. The engine 30 also essentially consists of an engine block 31 with a liner 33 and a piston 34 as well as a cylinder head 32. The piston 34 closes off a main combustion space 35. Additionally, an ignition chamber 36 is further arranged in the cylinder head 32, which is formed by an ignition chamber upper part 37 and by an ignition chamber lower part 38. The main combustion space 35 and ignition chamber 36 are in communication with each other by way of an ignition channel 39. The spark plug 40 and an injection valve 41 for enriching the mixture in the ignition chamber 36 to the stoichiometric value are arranged at the ignition chamber.

The ignition chamber 36 is separated into separate parts, namely, the upper part and the lower part in order to be able to individually construct these parts double-walled with an embedded sintered layer 42a and 42b of metal hydride. The two wall parts of the upper or of the lower part, namely the outer wall part and the inner wall part are separated with respect to one another be purely axially extending preferably cylindrical separating surfaces. This offers the advantage that during the sintering operation, a pressure can be exerted on the sintering material by an axial compressing of the two walls of one part. An intimate granular connection and an intimate connection of the sintering material with the wall material come into existence as a result thereof. The cooling off of the completely sintered workpiece should take place again in a hydrogen atmosphere in order that a metal hydride can form in the sintered layer. Subsequently thereto, the separating surfaces between the outer wall and the inner wall of the parts can be hermetically tightly welded together along the externally accessible places by means of an electron beam welding operation, in which not only the pore volume in the sintered layer is evacuated in an advantageous manner but in which also a particularly small amount of heat is introduced into the workpiece.

For purposes of forming the layer 42a or 42b embedded in the ignition chamber insert, a high temperature metal hydride may be used which is decomposed only at temperatures within the range of 400° to 600° C. into metal and hydrogen because the operating temperature of such inserts is relatively high.

Additionally, the possibility is also illustrated by reference to the engine 30 according to FIG. 3 to equip the liner 33 with an embedded layer 45 for the more rapid heat-up of the liner during starting of the operation of the engine. For that purpose, the liner 33 is constructed of an outer liner 43 and of an inner liner 44 each of which liners are provided at one end with a radial collar 47a at the inner liner 44 and with a radial collar 47b at the outer liner 43. It is possible with the aid of these collars 47a, 47b to firmly stamp together a granulate of metal hydride filled into the interstice and to keep the same under compression pressure also during the sintering operation. The sintering, the cooling off in a hydrogen atmosphere, and the closing off of the hollow space under vacuum (welding seams 46) is to be realized also in the already described manner. For purposes of forming a layer 45 embedded in the liner 33, a metal hydride with a somewhat lower temperature level is to be selected because the temperature level of the liner is lower with engines at the operating temperatures thereof than that of the ignition chamber 36. Materials have to be selected for the inner and outer wall 44 and 43 of the liner which can be thermally stressed, are corrosion-resistant and above all are hydrogen-diffusion impervious. Insofar as the material for the inner wall 44 does not as such have good sliding properties from the start, it should at least be suitable that a slide layer can be applied by galvanic process.

Figure 3:
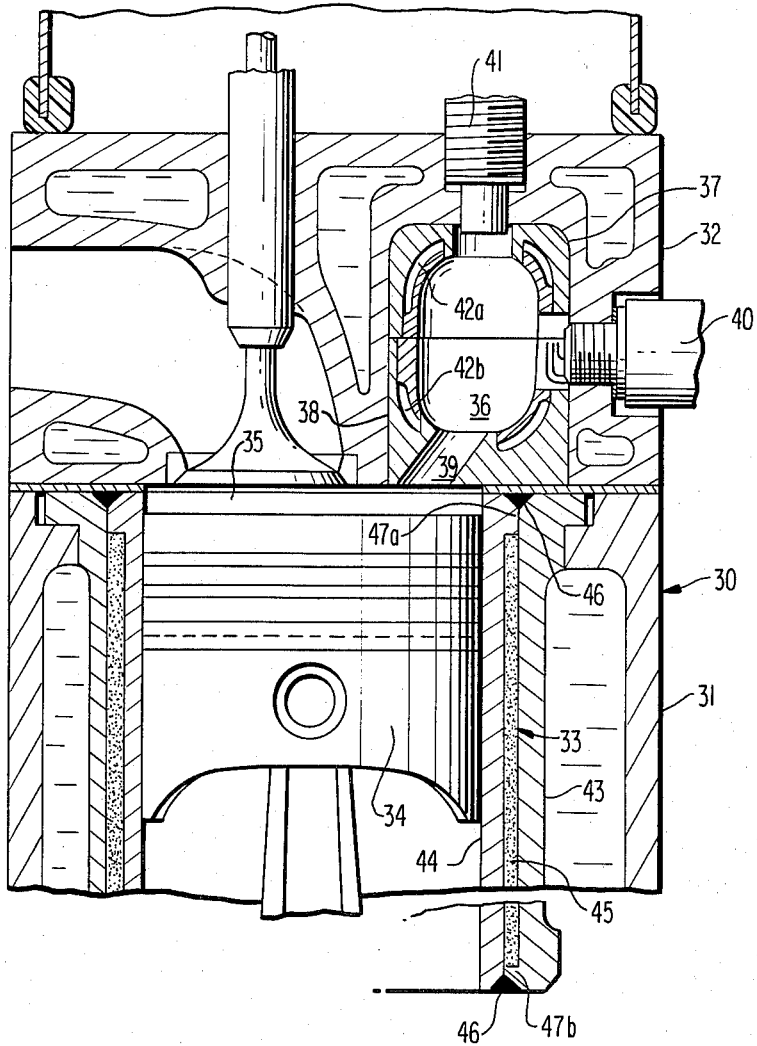
FIG. 3 is a cross-sectional view through a stratified charge engine with a combustion chamber insert according to the present invention.

The operation of the embedding of the sintered layer in the ignition chamber and liner of the embodiment of FIG. 3 is now as follows: In the cold condition, a metal hydride exists in each case in the layer 42a, 42b and 45, i.e., vacuum exists in the pores of the sintered layer and the hydrogen is completely bound in the metal. In this condition, the sintered layer can conduct heat only very poorly; it acts like a ceramic material. After the starting of the engine from the cold condition, the engine merely needs to heat up the inner wall 44 of the liner 33 and the inner wall part of the ignition chamber 36. These parts have a relatively low mass and a correspondingly slight heat storage capacity so that they reach their operating temperature very rapidly, for example, already after relatively few working cycles. The combustion exhaust gases of such an engine are therefore so composed already after a relatively short driving distance as with an engine operating at normal temperatures. An escape of the heat from the inner wall 44 of the liner to the cooling water or from the inner wall parts of the ignition chamber is prevented by the embedded layer 45, respectively 42a and 42b which is initially still in metal hydride form and is heat-insulating in this condition. It may lead to a slight overheating of the wall parts exposed directly to the heat admission. As a result thereof, the embedded layer is heated up and the hydrogen embedded in the layer material is thereby released into the pore volume, as a result of which the layer passes over into the purely metallic condition and becomes well heat-conducting. As a result thereof, the heat can flow off unimpaired through the entire cross section of the multi-layered liner 33 or of the ignition chamber insert to the cooling water. As long as the cooling water is still cold, a cooling off and therewith a hydrogen binding influence is exerted from the outside onto the embedded layer, from which results a tendency in the direction toward lesser conductivity. The reformation of the layer material into purely metallic condition therefore takes place in dependence on the heat-up of the water. The embedded metal hydride layer therefore exerts a certain self-controlling effect on the heat balance of the engine. As a result thereof, heretofore customary means or measures for the control of optimum water temperatures in the internal combustion engines may be dispensed with. It should also be mentioned for the sake of completeness that the embedding of a metal hydride layer into the liner or into other parts of engines is possible not only with a water-cooling system of the engine but also with air-cooling thereof without difficulties and with the same advantages.

Figure 4:
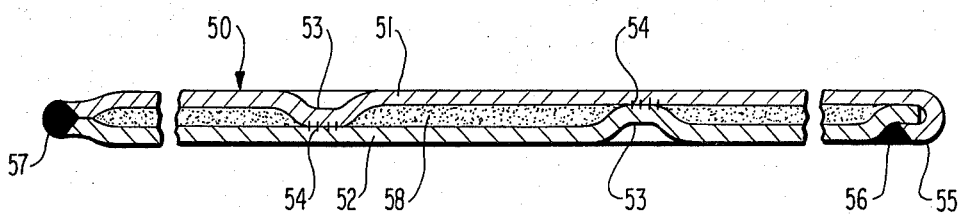
FIG. 4 is a cross-sectional view through a flat partition wall according to the present invention between spaces of different temperature which is suitable for the installation into an aggregate.

A wall element generally designated by reference numeral 50 with an embedded metal hydride layer 58 is illustrated in FIG. 4 which is suitable for the installation in heat-exchangers or the like. The wall element 50 is formed of a first sheet metal skin 51 of a second sheet metal skin 52. Knubs 53 are pressed-in into the sheet metal members which hold the sheet metal members at mutually predetermined distance. In order that the distance of the sheet metal members is assured both with external excess pressures as also with internal excess pressures, the sheet metal members are connected with each other by spot-welding 54 within the area of the knubs 53. The interstice or intermediate space between the sheet metal members 51 and 52 is filled out with a sintered layer 58 of metal hydride granules. The compressing pressure during the compressing of the granules and for the pressing during the sintering operation can be applied by compressing the sheet metal members between two correspondingly large-surfaced plungers. The sheet metal edges are peripherally hermetically closed, for which purpose a pointed seam welding 57 (to the left in FIG. 4) or a flange seam 55 with a welding 56 of the flanged edge (to the right in FIG. 4) may be applied. The cooling off after the sintering takes place also in this case appropriately in a hydrogen atmosphere for the formation of the metal hydride. At least the last partial piece prior to the final hermetic closure of the intermediate space enclosed by the sheet metal members 51 and 52 should take place in vacuum with as slight as possible a heat input into the workpiece.

The workpiece for the formation of the embedded layer 58 must be selected corresponding to the application purpose of the plate 50, i.e., the temperature range in which the decomposition of the metal hydride into hydrogen and metal takes place, must lie between the cooling off temperature or the blocking temperature of the wall and the operating temperature or the heat-transfer temperature of the wall element 50. Below the cooling or blocking temperature the wall element 50 has very poor heat-conducting properties whereas above the operating temperature or heat transfer temperature, it has normal metallic heat-conducting properties. Of course, not only flat plates but also curved shells or pipes can be made according to the embodiment of FIG. 4. The application of such wall elements is appropriate in all those cases in which a heat-exchange is to be coupled to certain temperature threshold values of the heat-transmitting or heat-emitting medium.

Figure 5:
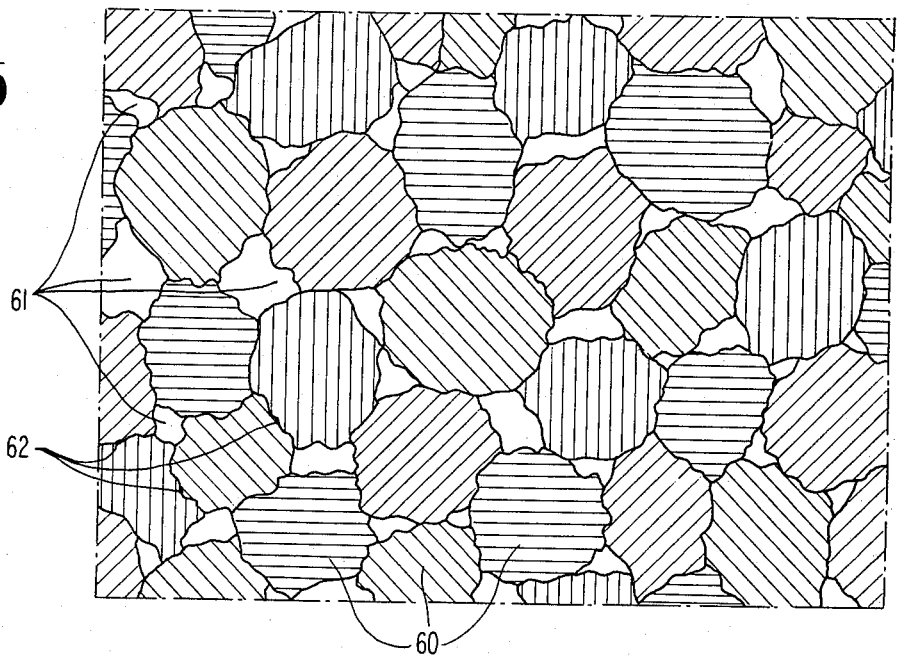
FIG. 5 is a strongly enlarged cross-sectional view through the porous construction of the embedded layer used with the present invention.

FIG. 5 illustrates in greatly enlarged form a part of a cross section through a porous sintered layer as is aimed at for the formation of the embedded layer. In the composite structure of this layer, granules 60 are areally welded to one another at the initially loose contact places in nearly molten condition under pressure and heat at these places 62. Pores 61 remain between the granules which serve for the absorption of hydrogen in gaseous condition and which are evacuated in the hydrogenated condition of the granules 60. By reason of the melting of the granules in the sintered composite (compound) structure, the same are connected with each other in a good heat-conducting manner. The sintered compound itself is gap- and crack-free as a whole; the latter would impair a good heat conduction—in the metallic condition of the granules. A running or flowing into one another of the granules with the wall material, i.e., therefore a good thermal contact comes into existence also at the contact places of the sintered compound with the adjoining hydrogen-impervious wall materials in case of a common sintering operation.

Figure 6:
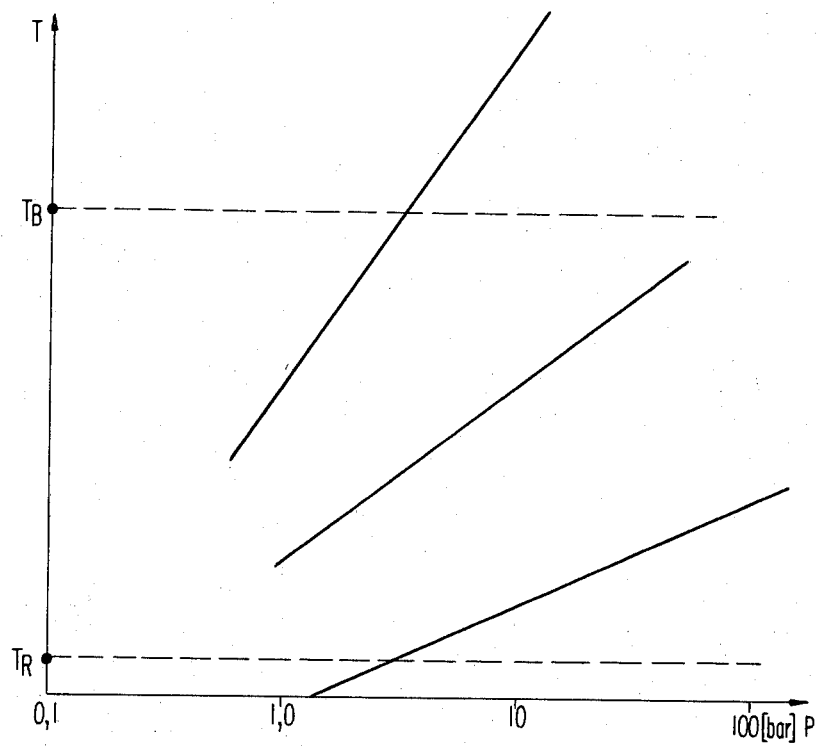
FIG. 6 is a diagram illustrating the basic configuration of the pressure/temperature curve of metal hydrides of different types.

The basic configuration of typical characteristic curves of different metals or metal alloys adapted to be hydrogenated is illustrated in the pressure/temperature diagram of FIG. 6. The configuration and the position of these characteristic curves and of the metals coordinated thereto is known as such in the art. One must now pick up for the formation of such an embedded layer according to the present invention in a diagram containing the characteristic curves of the different metals along the temperature axis the two limit values for the space- or cooling-off temperature $T_R$ and for the operating temperature $T_B$ and must seek out a characteristic curve lying between these two values respectively the corresponding material. High temperature hydrides are, for example, magnesium nickel hydride ($Mg_2NiH_4$), magnesium or titanium hydride ($MgH_2$ or $TiH_2$); a low temperature hydride would be, for example, titanium iron hydride.

Figure 7:
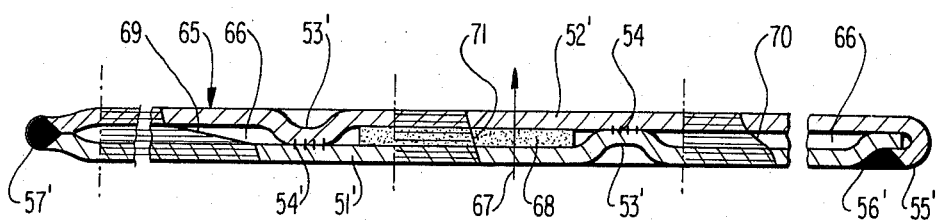
FIG. 7 is a cross-sectional view through a modified embodiment of a partition wall according to the present invention between spaces of different temperature.

A further wall element generally designated by reference numeral 65 is illustrated in FIG. 7 which—apart from the filling of its interior—coincides far-reachingly with the wall element of FIG. 4. Consequently, the corresponding parts are designated by the same, though primed reference numerals as used in FIG. 4. In differentiation to FIG. 4, the wall element 65 includes an evacuated hollow space 66 which is far-reachingly not filled out with anything. This evacuated hollow space 66 represents a good heat barrier for the heat flow 67 which is to be indicated by the steep temperature drop 69 to the left of this figure; this is true for the evacuated condition of the hollow space 66. A disk-shaped form-rigid pressed blank or sintered body of metal hydride granules is arranged at one place of the wall element—exposed to the heat flow 67. This body is placed loosely between the sheet metal members 51' and 52' prior to the welding-together of the sheet metal parts 51' and 52' by spot-welded connections 54'. In the hydrogenated condition, this body represents a poor heat conductor. This pressed part or sintered body serves as hydrogen donor which during heat-up by the heat flow 67 releases hydrogen and therewith fills the hollow space 66. In the gas-filled condition, the heat-transmission capability of the hollow space is considerably larger by reason of gas convection than in the evacuated condition. This increased heat transmission capacity is to be illustrated by the less steep temperature gradient 70 which is true for the gas-filled condition of the hollow space. The heat-conducting capability of the pressed part or sintered body 68 also increases by the dehydrogenating which is illustrated by the relatively flat temperature profile 71. With a decreasing heat flow and cooling off of the wall, the previously released hydrogen is again bound in the body 68 and the hollow space 66 is evacuated as a result thereof. It therefore attains again the good heat-damming or heat-insulating properties. This plate-shaped wall element 65 like that according to FIG. 4 may, of course, be constructed in all possible curvatures and contours matched to the particular application. A modified construction is also one in which the spacer knubs 53 or 53' are replaced by small tension-rigid tablet-shaped sintered bodies of metal hydride soldered-in or sintered-in between the plate 51 and 52, respectively 51' and 52'. With such a construction of the wall element according to FIG. 7, eventually a separate body 68 as hydrogen donor may be dispensed with because the many spacer sintered bodies maintaining the spacing can assume also to that extent the function of the hydrogen donor. Heat bridges at the knub places would be completely avoided thereby.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A thermally stressed heat-conducting structural part in which a temperature gradient forms when the heat conducting structural part is heated, the structural part including a pair of spaced walls, means for joining the spaced walls together so as to form a gas tight interstice between the pair of walls, characterized in that the walls are formed of a hydrogen-diffusion-impervious material, the interstice is completely filled with a metal hydride so that the pair of walls and metal hydride are connected in a heat-conducting manner, and in that the metal hydride completely filling the interstice is disposed substantially transversely to the temperature gradient.

2. A structural part according to claim 1, characterized in that the metal hydride filling the interstice is a porous metal hydride.

3. A structural part according to claim 2, characterized in that the metal hydride fills the interstice in an essentially gap-free or crack-free manner.

4. A structural part according to claim 3, characterized in that the metal hydride filling the interstice consists of sintered-together metal hydride granules.

5. A structural part according to claim 4, characterized in that the pore volume amounts to about 5 to 10% of the volume of the metal hydride filling the interstice.

6. A structural part whose temperature is changeable between an operating temperature and a rest temperature during non-operation according to claim 5, characterized in that the metal hydride filling the interstice is so selected that, at the operating temperature, the hydrogen is at least approximately completely released and, at the rest temperature, is at least approximately completely bound.

7. A structural part according to claim 1, characterized in that the metal hydride fills the interstice in an essentially gap-free or crack-free manner.

8. A structural part according to claim 1, characterized in that the metal hydride filling the interstice consists of sintered-together metal hydride granules.

9. A structural part according to claim 1, characterized in that the pore volume amounts to about 5 to 10% of the volume of the metal hydride filling the interstice.

10. A structural part whose temperature is changeable between an operating temperature and a rest temperature during non-operation according to claim 1, characterized in that the metal hydride filling the interstice is so selected that, at the operating temperature, the hydrogen is at least approximately completely released and, at the rest temperature, is at least approximately completely bound.

* * * * *